United States Patent

[11] 3,568,037

[72] Inventors Malcolm Williams
   Solihull;
   Duncan Barry Hodgson, Whitnash,
   Leamington Spa, England
[21] Appl. No. 811,096
[22] Filed Mar. 27, 1969
[45] Patented Mar. 2, 1971
[73] Assignee Joseph Lucas (Industries) Limited
   Birmingham, England
[32] Priority Apr. 1, 1968
[33] Great Britain
[31] 15,506/68

[54] ELECTRICAL SUPPLY SYSTEMS INCORPORATING A PERMANENT MAGNET ALTERNATOR WITH VOLTAGE REGULATION
5 Claims, 2 Drawing Figs.
[52] U.S. Cl. ................................. 321/18,
   317/16, 317/31, 320/39, 320/71, 322/28, 322/91,
   323/22
[51] Int. Cl. ................................. H02m 1/08

[50] Field of Search ......................... 320/(SCR),
   39, 40, 48, 59, 71; 321/18; 322/28, 91, 95; 317/16,
   31, 33; 323/(Termatrix), 4, 9, 16—22

[56] References Cited
UNITED STATES PATENTS
| | | | |
|---|---|---|---|
| 3,260,917 | 7/1966 | Shimwell et al. | 321/18 |
| 3,341,763 | 9/1967 | Noddin | 320/39 |
| 3,436,639 | 4/1969 | Burkett et al. | 320/39X |
| 3,488,560 | 1/1970 | Konopa | 322/28X |

Primary Examiner—James D. Trammell
Assistant Examiner—G. Goldberg
Attorney—Holman, Glascock, Downing & Seebold ABSTRACT: In a battery-charging system a permanent magnet alternator has a winding connected at one end to one supply line and at its other end connected to the other supply line through a diode. In order to control the output from this winding, a gate controlled semiconductor switch, which can by way of example be a thyristor or a new device called a triac, is connected across the winding, and is provided with base current only when the voltage between the lines reaches a predetermined value.

PATENTED MAR 2 1971 3,568,037

INVENTOR
Malcolm Williams & Duncan Barry Hodgson
BY Holman, Glascock,
Downing & Seebold
ATTORNEYS

ELECTRICAL SUPPLY SYSTEMS INCORPORATING A PERMANENT MAGNET ALTERNATOR WITH VOLTAGE REGULATION

This invention relates to electrical supply systems, in particular for road vehicles.

An electrical supply system according to the invention comprises in combination a pair of supply lines the voltage between which is to be maintained substantially constant, a permanent magnet alternator having a winding with one end connected directly to one of the supply lines and its other end connected to the other supply lines through a diode, a gate-controlled semiconductor switch connected across said winding, and voltage sensing means connected across the supply lines and serving to supply gate current to said switch when the voltage between the supply lines exceeds a predetermined value.

The expression "gate controlled semiconductor switch" is used throughout this specification and claims to denote a semiconductor switch having the property that it can be switched to conduction by a pulse applied to its gate, and thereafter continues to conduct when the pulse is removed until the current flowing through the device falls to zero. The best known example of such a device is of course the thyristor, which can conduct in one direction only when triggered by a positive gate-cathode pulse. However, the invention can also make use of a device known as a triac, which can conduct current in either direction, and furthermore can be triggered by either a positive or a negative pulse between its gate and cathode.

Figure 1:
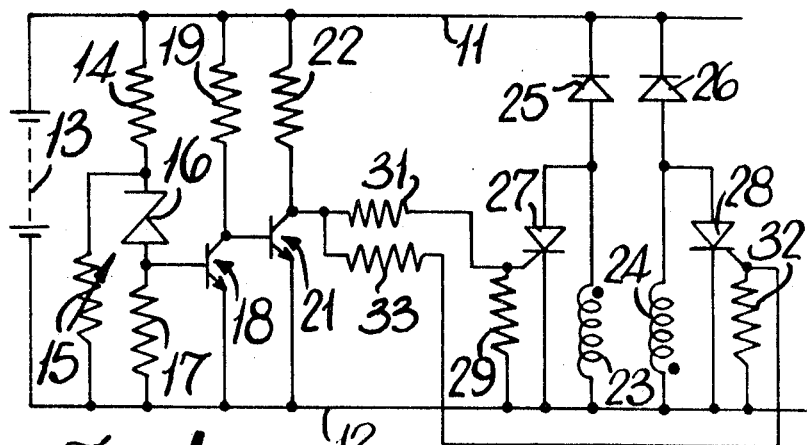
FIG. 1 is a circuit diagram illustrating one example of the invention.

Referring to FIG. 1, the supply system of a road vehicle includes positive and negative supply lines 11, 12 between which the battery 13 of the vehicle is connected. Connected in series between the lines 11, 12 are a resistor 14 and a variable resistor 15, the resistor 15 being bridged by a Zener diode 16 and a resistor 17 in series. The junction of the Zener diode 16 and resistor 17 is connected to the base of an NPN transistor 18, the emitter of which is connected to the line 12 and the collector of which is connected through a resistor 19 to the line 11. The collector of the transistor 18 is further connected to the base of an NPN transistor 21, the emitter of which is connected to the line 12 and the collector of which is connected through a resistor 22 to the line 11.

The engine of the road vehicle drives a permanent magnet alternator which has a pair of single phase windings 23 and 24. The windings 23,24 each have one end connected to the line 12, and their opposite ends are connected through diodes 25 and 26 respectively to the line 11. The The windings are oppositely wound, and provide to the supply lines half-wave rectified outputs which are 180° out of phase.

The windings 23 and 24 are bridged by thyristors 27 and 28 respectively. The gate of the thyristor 27 is connected through a resistor 29 to the line 12, and through another resistor 31 to the collector of the transistor 21. Similarly, the gate of the thyristor 28 is connected through a resistor 32 to the line 12 and through a resistor 33 to the collector of the transistor 21.

As long as the voltage between the lines 11 and 12 is below a predetermined level determined by the setting of the resistor 15, the Zener diode 16 is nonconductive and the transistor 18 is off, so that base current is supplied to the transistor 21 through resistor 19, and current flowing through the resistor 22 flows through the collector and emitter of the transistor 21. No gate current is supplied to the thyristors 27 and 28, and the windings 23 and 24 provide an output to the lines 11 and 12. When the predetermined voltage is reached, the Zener diode 16 conducts to turn on the transistor 18, so removing base current from the transistor 21 and permitting current flow through the resistor 22 to flow through the resistors 31 and 33 to turn on the thyristors 27 and 28, which short circuit the outputs of the windings 23 and 24 respectively. The thyristors 27 and 28 remain conducting until the voltage between the supply lines 11 and 12 falls below the predetermined level, at which point the Zener diode 16 ceases to conduct, and the transistor 21 conducts again, so that each of the thyristors 27 and 28 turns off as soon as it is reverse biased. It will be appreciated that the short circuit current is not passed through the diodes 25 and 26.

Figure 2:
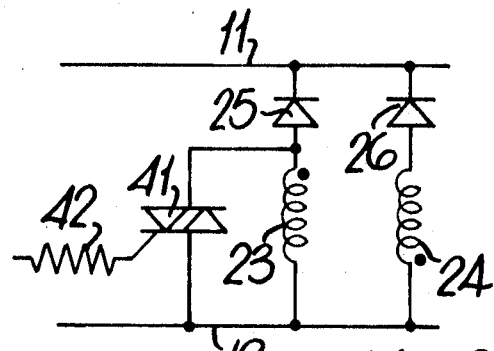
FIG. 2 illustrates part of a second example.

In the example shown in FIG. 2, a pair of windings 23 and 24 and associated diodes 25 and 26 are used as in FIG. 1. However, in this case the winding 23 is bridged by a triac 41, the gate of which is connected through a resistor 42 to the collector of the transistor 21 shown in FIG. 1. The operation is similar to FIG. 1 in that the triac 41 is turned on whenever the Zener diode 16 conducts, and so short circuits the output from the winding 23. Another modification in FIG. 2 is that no switch is connected across the winding 24. The reason for this is that provided the coupling between the windings 23 and 24 is sufficiently high, there is sufficient transformer action to ensure that when the triac 41 is conducting the winding 24 fails to provide a significant output to the lines 11 and 12. It will of course be understood that the use of a single switch only is not applicable to the arrangement in FIG. 1 using thyristors, because the thyristors can conduct only in one direction. Of course if desired a pair of triacs could be used in FIG. 2.

We claim:

1. An electrical supply system comprising in combination a pair of supply lines the voltage between which is to be maintained substantially constant, a permanent magnet alternator having a winding with one end connected directly to one of the supply lines and its other end connected to the other supply line through a diode, a gate-controlled semiconductor switch connected across said winding, and voltage-sensing means connected across the supply lines and serving to supply gate current to said switch when the voltage between the supply lines exceeds a predetermined value.

2. A system as claimed in claim 1 in which the permanent magnet alternator includes a second winding also having one end connected to said one of the supply lines and its other end connected to the other supply line through another diode, the first and second winding providing to the supply lines half-wave rectified outputs which are 180° out of phase, the system including a second gate controlled semiconductor switch connected across the second winding, the second switch being supplied with gate current at the same time as the first switch.

3. A system as claimed in claim 1 in which the switch is a thyristor.

4. A system as claimed in claim 1 in which the switch is a triac.

5. A system as claimed in claim 1 in which the switch is a triac and the permanent magnet alternator includes a second winding and also having one end connected to one of the supply lines and its other end connected to the other supply line through a diode, the first and second windings providing to the supply lines half-wave rectified outputs which are 180° out of phase, the degree of coupling between the windings being sufficient to allow a single triac to be used.